United States Patent Office 3,502,601
Patented Mar. 24, 1970

3,502,601
NOVEL POLYURETHANES AND PROCESSES OF PREPARING THE SAME
Leslie C. Case and Laura K. Case, both of 14 Lockeland Road, Winchester, Mass. 01890
No Drawing. Continuation-in-part of applications Ser. No. 168,062, Jan. 23, 1962, Ser. No. 188,842, Apr. 19, 1962, Ser. No. 456,816, May 18, 1965, and Ser. No. 485,932, Sept. 8, 1965. This application Jan. 26, 1967, Ser. No. 611,826
Int. Cl. C08g 23/44, 53/10
U.S. Cl. 260—2.5                                    39 Claims

ABSTRACT OF THE DISCLOSURE

This invention relates to polyurethanes formed from the reaction of organic polyisocyanates and novel polyols containing both ether and ester segments. These novel polyols are prepared by the reaction of a polyfunctional organic compound selected from among alcohols, thiols and carboxylic acids, a cyclic anhydride of an aromatic or carbocyclic organic polycarboxylic acid, and an epoxide or oxetane. The subject polyurethanes have especially good physical properties at high polyol equivalent weight.

---

This application is a continuation-in-part of applications Ser. No. 168,062, filed Jan. 23, 1962, Ser. No. 188,842, filed Apr. 19, 1962, Ser. No. 456,816, filed May 18, 1965, and Ser. No. 485,932, filed Sept. 8, 1965, all now abandoned.

Polyurethane compositions are generally derived from the cross-linking reaction of the thermoplastic polymer having terminal hydroxyl groups, commonly referred to as a polyol, and an organic polyisocyanate, and many suitable polymers and formulations are known. The present state of the polyurethane art is, however, characterized by two principal disadvantages. Thermoplastic polymers suitable for polyurethane formulations belong to the broad class of polyether polyols or polyester polyols. Because of cost and viscosity requirements, commercial rigid polyurethane foams have thus far been based nearly exclusively on polyether polyols, even though in many cases polyester polyols would be inherently more desirable for use because of better physical properties in the final foam. The polyester polyols described in the art which have a viscosity suitable for use in conventional foaming techniques and equipment contain a substantial amount of ester units derived from linear saturated aliphatic dicarboxylic acids, such as succinic acid or adipic acid, which are relatively expensive. The use of such polyester polyols in polyurethane formulations has therefore been confined to specialty applications where cost is relatively unimportant. Ordinary alkyl resin-type polyesters derived exclusively from inexpensive aromatic dicarboxylic acids, such as phthalic acid or isophthalic acid possess viscosities far in excess of that suitable for use in commercial rigid polyurethane foams. Such polyesters are composed of the repeating structural unit

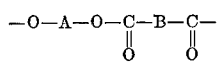

wherein A is the residue of a glycol HO—A—OH, and B is the residue derived from the dicarboxylic acid

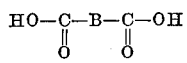

and they can be prepared by polycondensation techniques from these reactants, or by a process described in British Patent 839,773, or by the strong-base-catalyzed reaction of monoepoxides with dicarboxylic acid anhydrides, or by other specialized techniques. Regardless of the method by which they are prepared, however, ordinary polyester polyols from aromatic diacids tend to be extremely viscous or of a glassy nature at room temperature, making it difficult or impossible to mix these polyols properly with the other components of the foam formulation, such proper mixing being essential to the production of good quality foams with uniform pore structure and strength. As illustrated in Example 1, such polyester polyols with appropriate equivalent weight and functionality to be suitable for use in polyurethane compositions are essentially solid at room temperature, having a viscosity of much more than 1,000,000 centipoises at room temperature. Heating these materials to an elevated temperature where they would be fluid enough to be mixed conveniently with the other formulation components obviously constitutes an undesirable inconvenience per se, requires special equipment and also makes it difficult to use the inexpensive, superior-performance, low-boiling blowing agents preferred in the art. In addition, stiff, rigid polyurethane products prepared from such polyesters by specialized techniques tend to be brittle and easily fractured rather than tough.

Another disadvantage of present polyurethane formulations is the relatively high polyisocyanate content which is required to prepare useful compositions. A high polyisocyanate content in a polyurethane formulation, besides increasing its cost, also leads to deleterious side effects, such as thermal instability, chemical instability, brittleness, and a tendency toward yellowing upon exposure to sunlight. Consequently, as far as cost and such properties are concerned it would be desirable to use as little polyisocyanate as possible. The amount of polyisocyanate required to obtain a satisfactory composition depends on the polyol employed and is directly proportional to the number of reactive hydroxyl groups in the polyol, or inversely proportional to the polyol equivalent weight which is defined as the average molecular weight of the polyol per hydroxyl group. It would thus be desirable to employ polyols with higher equivalent weights than those currently in use, the equivalent weights of which range from about 100 to a maximum of about 150, and mostly from about 100 to 135. However, when attempts are made to increase the equivalent weight of the polyols presently in use the resulting polyurethane compositions lack the required degree of rigidity, stiffness and strength to be useful and in addition other physical properties, such as their humid aging characteristics are severely impaired.

The present invention provides a solution to both of the disadvantages described above. It has now been found quite unexpectedly that polyurethane compositions with excellent physical and chemical properties can be formed by the cross linking with organic polyisocyanates of novel polyfunctional polyols having viscosities suitable for handling at or near room temperature yet containing ester members derived solely from aromatic polycarboxylic acids. The present invention provides rigid polyurethane compositions having increased toughness, better thermal and color stability, excellent shrinkage characteristics and superior resistance to humid aging. It has further been found that polyurethane compositions can be prepared from polyols having equivalent weights which are 25–100 percent higher than those of polyols presently in use. It is therefore another objective of the present invention to provide desirably rigid, tough polyurethane compositions which have a lower polyisocyanate content, are less expensive and have humid aging characteristics as good as, or better than, compositions prepared from the lower equivalent weight polyols in present commercial use.

This invention deals with the use of novel hydroxyl-terminated polyfunctional, thermoplastic polyester-polyether copolymers containing aromatic or other cyclic hydrocarbon ring structures and being suitable for use in combination with polyisocyanates in the preparation of rigid polyurethane foams, castings and coatings with highly desirable properties. The hydroxyl-terminated polyfunctional polyester-polyether copolymers which are used have suitably low melt viscosities and lead to desirably tough polyurethane formulations without the use of high-cost ingredients. These copolymer polyols allow the preparation of stiff, tough polyurethane products with a lower polyisocyanate content than formulations currently in use. The lower polyisocyanate content made possible by the use of the polyols of this invention leads to increased chemical, thermal and light stability of the final polyurethane product.

The thermoplastic polyols contemplated for use in this invention are complex in structure and contain both ester and ether linkages in substantial and random proportions and they have a significant amount of cyclic hydrocarbon radicals incorporated into the main linear polymer chain backbone along with aliphatic ether segments, the said polymer chains being terminated by hydroxyl end groups. They are broadly defined as polyfunctional polyester-polyethers since they contain both polyester and polyether units and each polymer molecule adjustably has at least two, and usually at least three, and preferably at least four, hydroxyl groups capable of reacting with isocyanate groups, that is, each molecule is at least difunctional and preferably has a functionality of more than two. The copolymers suitable for use in the preparation of the polyurethanes of this invention are derived from polyfunctional compounds having at least two, and preferably at least three active-hydrogen-containing radicals of the group consisting of hydroxyl, carboxyl and sulfhydryl radicals, by replacing all or a major fraction of these radicals in these polyfunctional compounds with hydroxyl-terminated linear polymer chains which are essentially composed of (X) 1,3-oxyalkylene groups or segments having the general structure

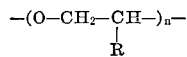

wherein R is selected from the group consisting of hydrogen, lower alkyl radicals and lower haloalkyl radicals, and $n$, the degree of polymerization, is a positive integer varying from one to generally not more than ten, with the average value of $n$, e.g. the average degree of polymerization, ranging generally from at least 1.5 to about 6.0 and advisably from at least about 2.0 and preferably from about 2.5 to about 4.0, and (Y) ester units having the general formula

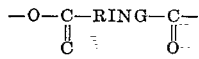

wherein RING represents a cyclic hydrocarbon radical having from 6 to 12 carbon atoms and from zero to six halogen substitutents selected from the group consisting of chloro and bromo radicals, and being selected from the group consisting of aromatic radicals, such as phenylene and saturated cycloaliphatic radicals, such as cyclohexylene, said ester units being derived from a cyclic organic polycarboxylic acid having the carboxylic acid groups attached directly to the cyclic hydrocarbon radical. Particularly useful copolymers are those in which the cyclic hydrocarbon radical is selected from the group consisting of 1,2-phenylene, 3,4,5,6-tetrachloro-1,2-phenylene, 3,4,5,6-tetrabromo-1,2-phenylene, 3,4,5,6-tetrahydro-1,2-phenylene, and 1,4,5,6,7,7-hexachloro-(2,2,1)-bicyclo-2,3-heptenylene-5-, and R is hydrogen or a methyl or ethyl radical.

While the overall structure of the copolymer polyols employed in the present invention can best be described as random, it should be noted that the sequences of the individual linkages in the polymer chain are not precisely random in that only certain sequences of linkages may be present. As a polymer chain is traversed, certain limitations apply to the sequential order in which the linkages appear. Specifically, the ester linkages are always present in pairs separated by, and attached to, the cyclic hydrocarbon radicals, and such a pair of ester linkages is usually separated by one or more oxyalkylene groups from a second pair of ester linkages. The oxyalkylene groups may occur singly or in sequences to form segments with each segment containing at least two oxyalkylene groups, and frequently as many as 3 or 4, and rarely as many as 8 or 10, and very rarely exceeding 15 oxyalkylene groups. Thus the polymer chains may contain other segments composed of a mixture of mono-, di-, tri-, and higher polyether units. The polyether segments may be bounded by either ester or hydroxyl groups, or by the residue of the polyfunctional compound.

Useful polyester-polyether polyols are characterized by having per kilogram of polymer at least about 0.5 gram mol and advisably at least 1.0 gram mol and generally not more than 4.2 gram mols of cyclic hydrocarbon radicals, with the exact amount varying within this range depending on the specific nature of the cyclic hydrocarbon radical selected. Thus, when the cyclic hydrocarbon radical is derived from phthalic or tetrahydrophthalic acid the amount will usually range from about 1.0 to generally not more than 4.2 gram mols per kilogram of polyol. With heavier cyclic hydrocarbon radicals such as tetrabromophenyl and tetrachlorophenyl the lower limit will be about 0.5 gram mol and the maximum about 1.9 gram mols of cyclic radical per kilogram of polyester-polyether polyol. As a general rule, the lower the desired equivalent weight, the lower the content of the cyclic radicals. Thus, if a very low equivalent weight, such as 100, is desired, it is necessary to employ only about 0.5 to 1.0 gram mol of cyclic hydrocarbon radical per kilogram of polymer. The weight of the cyclic hydrocarbon radicals including substituents, but excluding ester groups attached thereto is in the region of about 5%, and frequently about 10%, to about 60% by weight of the final polyol, with the lower part of the range being primarily for lighter radicals, such as phenylene and cyclohexylene, and the higher part of the range for heavier radicals, such as the halogenated ones.

The main acyclic aliphatic chain between noncarbonyl ester oxygen atoms is composed of both ether oxygen atoms and carbon atoms and these aliphatic chain segments should contain an average of 3.5 to 17, and advisably 5 to 14, atoms. The aliphatic ether chain segments should also contain an average of at least about 0.5, advisably at least about 1.0, and preferably at least 1.5, and generally not more than 5 ether oxygens per aliphatic chain, viz., between ester groups.

The polyols useful in preparing the polyurethanes of this invention are additionally characterized by having an average functionality of at least about two and advisably at least three and preferably at least four, and generally less than 25, and frequently less than 13. Polyols with functionalities above 25 may desirably be employed in certain circumstances. In most cases the average functionality will vary from somewhat less than 3 up to about 10, and preferably will range from about 5 to 8. Suitable polyester-polyether polyols are further characterized by having desirably low melt viscosities so as to permit handling and mixing at or near room temperature, with the viscosities at room temperature, as measured by a rotating spindle viscometer, such as a Brookfield viscometer, generally not exceeding 1,000,000 and preferably not exceeding 500,000 centipoises and advisably being less than 200,000 centipoises, and desirably falling within the range of 1000 to 100,000 centipoises. Polyols having higher or lower viscosities may be prepared, if desired. The average molecular weight per chain end, e.g. the equivalent weight, of the polyols suitable for preparing the polyurethanes of this invention will range from at least 80 to generally not more than 1500, and advisably will range from about 100 to about 300, and will preferably range from about 120 to about 250. The hydroxyl number of polyols suitable for use will range from 700, and advisably from about 560 to less than 200, and frequently will range from about 400 to 280, and occasionally will vary from 230 to 280. The hydroxyl number is a measure of, and is proportional to, the hydroxyl content per unit weight of polyol and is defined in terms of milligrams of potassium hydroxide per gram of polyol and represents the difference between the amount of KOH required to neutralize the acetic acid resulting from the hydrolysis of a known amount of acetic anhydride before and after esterification of the hydroxyl groups of the polyol according to standardized procedures. The instant polyols will also contain very little, if any, unsaturated acyclic olefinic linkages with a maximum of 0.5 gram mol of olefinic linkages per kilogram of polyester-polyether polyol. Suitable polyols will also have a very low acid number, generally not exceeding a value of five, and preferably being two or less.

The polyester-polyether polyols suitable for use in preparing the polyurethanes of this invention are produced inexpensively, in one step, by the process described in our copending applications Ser. No. 168,062, filed Jan. 23, 1962, and Ser. No. 456,816, filed May 18, 1965, which are hereby included by reference. According to this process, suitable polyester-polyether polyols are produced by copolymerizing at superatmospheric pressure and at a temperature of about 70° C. to 200° C., and preferably at 110–160° C., (1) a terminal lower aliphatic epoxide, (2) a cyclic organic polycarboxylic acid monoanhydride having a cyclic anhydride group attached directly to a cyclic hydrocarbon radical having from 6 to 12 carbon atoms and from zero to six substituents selected from the group consisting of chloro and bromo radicals, and (3) a polymerization starter. Suitable polymerization starters which can be used comprise the group consisting of water, hydrogen sulfide, and organic compounds having at least two, and advisably at least three, and desirably at least four, radicals selected from the group consisting of hydroxyl, carboxyl, and sulfhydryl radicals, e.g. OH, COOH, and SH radicals, and aqueous mixtures thereof. Polymerization starters may contain other substituents which do not influence or interfere with the course of the polymerization, such as halo radicals, ester radicals, ether radicals and the like.

Polymerization starters useful in the present invention are aliphatic polyfunctional alcohols, polyether alcohols, polycarboxylic acids, hydroxy-carboxylic acids, thiolcarboxylic acids, polymercaptans, polyfunctional phenols, and saccharides. Mixtures of starters may be used to advantage. One embodiment of this invention contemplates for use as a polymerization starter mixtures of alcohols or saccharides with up to thirty percent by weight of water. Hydrates of saccharides are also useful as starters.

The polymerization starters which are preferred for the preparation of the polyurethane-forming polyols of this invention are compounds having at least three, and preferably at least four alcoholic hydroxyl groups, such as the saturated aliphatic triols, tetrols and higher polyols, and the lower saccharides, such as the monosaccharides, disaccharides and trisaccharides, and mixtures of saccharides with the said polyols.

In preparing the polyol components of the polyurethanes of this invention useful cyclic monoanhydrides are those having the general structural formula

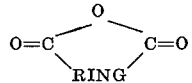

wherein RING is a cyclic hydrocarbon radical having from 6 to 12 carbon atoms and from zero to six halogen substituents selected from the group consisting of chloro and bromo radicals. Both monocyclic and polycyclic hydrocarbon radicals are useful and they may be aromatic or cycloaliphatic in nature.

Anhydrides having from 8 to 14 carbon atoms and from zero to six halogen substituents selected from the group consisting of chloro and bromo radicals are generally employed. Examples of particularly useful anhydrides are phthalic anhydride, 3,4,5,6-tetrachlorophthalic anhydride, 3,4,5,6-tetrabromophthalic anhydride, 1,4,5,6,7,7-hexachloro-bicyclo - (2,2,1) - 5 - heptene-2,3-dicarboxylic acid anhydride, hereinafter referred to as Chlorendic anhydride, and tetrahydrophthalic anhydride. Other useful anhydrides are 2,2'-biphenyl dicarboxylic acid anhydride, hereinafter referred to as diphenic anhydride, pyromellitic anhydride, and trimellitic anhydride. Bicyclic adducts of maleic anhydride or tetrahydrophthalic anhydride with cyclic aliphatic diolefins, such as vinylcyclohexene, cyclopentadiene and perchlorocyclopentadiene are also useful. Other anhydrides may be used. Phthalic anhydride is particularly preferred because of its ready availability and low cost. The use of halogenated anhydrides is advantageous in preparing flame-retardant compositions. Mixtures of anhydrides may be employed.

Small amounts of saturated aliphatic dibasic acid anhydrides can be admixed with the above anhydrides, but in order to realize the full benefits of this invention these materials are advisably excluded.

Particularly suitable, among the terminal lower aliphatic monoepoxides contemplated for use in this invention are epoxides having from two to six carbon atoms and having the general formula

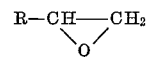

wherein R is selected from the group consisting of hydrogen, lower alkyl groups having from one to four carbon atoms and lower haloalkyl groups. Very useful epoxides are ethylene oxide, propylene oxide, 1,2-butylene oxide and epichlorohydrin. Mixtures of epoxides may be employed. Ethylene oxide is advisably used in admixture with not less than an equimolar amount of a higher molecular weight epoxide, such as propylene oxide. The preferred epoxide for use in preparing the polyols used in this invention is propylene oxide.

Useful alcoholic polymerization starters are the polyfunctional aliphatic alcohols having from two to 15 carbon atoms and from two to eight hydroxyl groups, and the aliphatic ether alcohols having from four to 36 carbon atoms and from two to eight hydroxyl groups. Particularly preferred are saturated aliphatic polyols having from three to six carbon atoms and from three to six hydroxyl groups. Representative of very useful polymerization starters are, among others, ethylene glycol, propylene glycol, diethylene glycol, triethylene glycol, dipropylene glycol, glycerol, diglycerol, trimethylolethane, trimethylolpropane, 1,2,6-hexanetriol, pentaerythritol, dipentaerythritol, tripentaerythritol, sorbitol, xylitol, mannitol, and inositol. Especially useful is a commercially available mixture of linear polyols having from three to six carbon atoms, an average molecular weight of about 160 and an average equivalent weight of about 32. Other mixtures of polyols and polyether polyols may advantageously be used. Polyether polyols having from three to eight hydroxyl groups and equivalent weights ranging from 80 to 160, such as for example oxypropylene adducts of polyols like glycerol or sorbitol, or of saccharides like sucrose, and others may also be employed as polymerization starters. Polyvinylalcohol and partially hydrolyzed polyvinylacetate are also of use. Mixtures of polyols and water containing up to 30% by weight of water are also of use.

Another group of very useful polymerization starters having alcoholic hydroxyl groups are saccharides. Monosaccharides and polysaccharides and ether derivatives thereof may be employed. Preferred for use are mono-, di-, and trisaccharides, that is, saccharides having from 5 to 18 carbon atoms and from four to 11 hydroxyl groups. Particularly preferred are monosaccharides and disaccharides. Polysaccharides having more than three saccharide units per molecule are also usable but lead to polyols having viscosities in excess of those desirable for most applications. Polyols derived from such polysaccharide starters are of value, however, as components for blending with very low viscosity polyols and they impart highly desirable properties to the polyurethane compositions derived from such blends. Examples of useful saccharide polymerization starters are dextrose, xylose, sucrose, maltose, methyl glucoside, ethylene glycol diglucoside, alpha-cyclodextrin, beta-cyclodextrin, gamma-cyclodextrin and corn syrup. Sassharides other than those named may be used. Mixtures of the afore-mentioned saccharides with polyols, saccharide hydrates, and mixtures containing up to 30 percent by weight of water are also suitable for use as polymerization starters. Thus, examples of other suitable starters for use in this invention are maltose hydrate, lactose hydrate, raffinose hydrate, dextrose hydrate and concentrated aqueous solutions of sucrose and dextrose.

Another preferred embodiment of this invention contemplates the use of higher polysaccharides in admixture with polyols as polymerization starters. Suitable mixed starters are composed of polysaccharides having at least three saccharide units per molecule and saturated aliphatic polyols having from two, and preferably from three to six carbon atoms and from two, and preferably from three to six hydroxyl groups, e.g. polyols of the type described hereinabove. Polyols having a melting point of about 125° C. or less are preferred in this embodiment. The proportion of polysaccharide in the polysaccharide-polyol starter mixture will generally range from about five percent to about 90 percent, and preferably from 20 percent to about 60 percent by weight based on the weight of the combined starter mixture. Polysaccharides suitable for use in admixture with polyols comprise homopolysaccharides and heteropolysaccharides having at least three monosaccharide units per molecule. In order to be suitable for use the polysaccharides should have a solubility in water of at least fifty percent, and advisably at least 75 percent, and preferably at least 90 percent. Suitable polysaccharides are those selected from the group consisting of linear, branched and cyclic dextrins, plant gums, plant mucilages, dextrans and pectins. Solubilized starches, molasses and corn syrup are also of use. The use of dextrins and plant gums is preferred. The term dextrin is used herein and in the art to describe polysaccharide products of a complex nature resulting from the partial hydrolysis of starch, such as corn starch, potato starch and the like, in the presence of heat alone, or in combination with acid, or by enzymes. Available linear and branched dextrins are produced in three types classified as white dextrins, yellow or canary dextrins and British gums, and all such dextrins are suitable. The term plant gum as used herein and in the art refers to naturally occurring plant exudates having a complex polysaccharide structure. For optimum results in the preparation of polyurethane foams, the polysaccharides employed should not contain more than one percent by weight of water. Representative of the polysaccharides which are useful in mixed polyol-polysaccharide starters are dried corn syrup solids, corn dextrins, potato dextrins, British gum, alpha-cyclodextrin, beta-cyclodextrin, gamma-cyclodextrin, tragacanthin, gum acacia, ghatti gum, karaya gum, gum arabic, mesquite gum, damson gum, gum tragacanth, flaxseed mucilage, dextran and pectin and the like. Particularly preferred are the canary corn dextrins, British gums, and the cyclodextrins.

Organic polycarboxylic acids and hydroxy-carboxylic acids constitute another group of suitable polymerization starters. Examples of such polymerization starters which can be used are isophthalic acid, adipic acid, hydroxyacetic acid, aconitric acid, citric acid, tartaric acid, malic acid, gluconic acid, tricarballylic acid, pyromellitic acid, trimellitic acid, succinic acid, mesoxalic acid and hydroxystearic acid. Starters frequently employed are those having from 2 to 18 carbon atoms and from one to four carboxyl radicals and from one to five hydroxyl radicals. Other available carboxylic acids and hydroxy-carboxylic acids may be used. Acidic natural products, such as gum copal and gum dammar are also of use.

Representative of useful sulfhydryl-group containing starters are such aliphatic thiolcarboxylic acids as alpha-mercaptoacetic acid and beta-mercaptopropionic acid and the carboxylic acid esters of these acids with organic polyols, such as, for example, pentaerythritoltetrakis-beta-mercaptopropionate or glyceral-tris-beta-mercaptopropionate. Polythiols such as dithioglycerol and trithioglycerol may also be employed. Thiokol-type polymers having free sulfhydryl groups and being of suitable molecular weight may also be used.

Examples of useful phenolic-hydroxyl-containing compounds are such phenols as resorcinol, catechol, phloroglucinol and 2,2-bis(4-hydroxyphenyl) propane. Useful phenols will generally have from six to 15 carbon atoms and from two, and preferably three, hydroxyl groups to about five hydroxyl groups. Other phenols, such as those derived from natural sources may be employed.

If starters containing carboxylic acid groups are employed, it should be noted that the proportion of reactants is advisably chosen such as to convert all of the carboxyl groups into carboxylic acid ester groups, whereas in the case of hydroxylic or sulhydrylic starters not all of the hydroxyl or sulfhydryl groups need necessarily react to form polymer chains. In fact, it is sometimes quite desirable to have some unreacted starter hydroxyl groups present in the final polyol. Specifically, in some instances, up to ⅓, and sometimes ½ of the polyol hydroxyl groups may consist of unreacted starter hydroxyl groups.

The copolymerization is effected by bringing the reactants together at elevated temperatures and superatmospheric pressure, advisably in a closed system, in a manner such that a substantial concentration of the monoepoxide is present intimately admixed with the other reactants during the time in which the major part of the reaction takes place. It is a critical requirement for the successful preparation of the polyester-polyether polyols suitable for use in this invention that the reactants are combined so that the ratio of equivalents of monoepoxide to the sum of equivalents of acid groups plus one-half the equivalents of anhydride groups in the reaction mixture is at least 0.3 and generally at least 1.0 during the time in which at least 50 percent and generally at least 75 percent of the polymerization takes place. A maximum of six equivalents of monoepoxide in this same ratio is generally used. For purposes of this invention one equivalent of cyclic ether is taken to be one mol of cyclic ether, and one equivalent of acid or anhydride is taken to be equal to that amount which is required to neutralize one mol of sodium hydroxide, e.g. one equivalent of acid group is equal to one gram mol of carboxylic acid divided by the number of carboxylic acid groups per mol, and one mol of anhydride equals two equivalents, so that one-half the number of equivalents of anhydride present generally equals the number of mols present. It should be clearly understood that in order to prepare polyols suitable for use in this invention it is absolutely essential that the reactants are combined such that a substantial epoxide concentration is always present during the time in which the major amount of the polymerization takes place. While it is frequently convenient to combine all the reactants initially before heating the reaction mixture, and while it is advisable that the total amount of the polymerization starter is present at the start of the reaction, it is to be understood that the entire amount of epoxide or all of the anhydride does not have to be present at the start of the reaction but that these reactants may be suitably added in a few sizable batch-wise portions during the course of the polymerization. To produce the polyester-polyether polyols suitable for use in this invention it is an absolutely essential critical requirement to avoid a mode of operation in which the epoxide is added in a large number of small increments, such as in a drop-wise fashion, as this will result in a highly viscous ordinary polyester containing essentially no polyether segments and being unusable at or near room temperature. In general, no more than ten additions of epoxide are made during the course of the reaction, and very seldom are more than twenty-five additions required.

A temperature of 70° C. or higher is usually used, although a temperature above 200° C., and advisably above 180° C., is generally not required and may lead to adverse results. For many systems suitable temperatures range from about 100° C. to 180° C., and frequently from about 120° to 160° C. If saccharides are employed the reaction is desirably conducted within a temperature range of about 120° C. to 150° C. If halogenated anhydrides, such as chlorendic anhydride are used, or a strong acid is used as a starter, temperatures as low as 70° C. will frequently be sufficient. With some reactants the polymerization once in progress may become exothermic enough so as to require cooling to keep the reaction mixture within the desired temperature range.

The process of this invention is advisably conducted in a closed system at superatmospheric pressures, such as autogenous pressure. A minimum pressure of 1.5 atmospheres is advisably used, and in most cases pressures will vary from at least about 50 pounds per square inch to about 300 pounds per square inch. The polymerization can be effected batch-wise, in a closed vessel, such as an autoclave equipped with agitation, or under continuous conditions in a tubular reactor at elevated temperatures. Because of the acidic nature of the reaction mixture equipment of sufficient corrosion resistance must be employed. The polymerization is generally completed within several hours with the exact time depending on the nature of the reactants and the temperature used.

The preparation of the polyols used in this invention is advisably conducted in the absence of any added catalysts. Moderately strong acids have been found to act as catalysts, and if such acids or their anhydrides are used the process becomes autocatalytic. It should be noted in this regard that in order to produce polyols suitable for use in this invention it is another essential critical requirement to avoid during the time in which free anhydride is present in the reaction mixture the presence of basic catalysts or other basic substances, such as amines, quaternary ammonium salts, alkali metal salts and inorganic hydroxides and the like. The presence of such substances even in very small amounts appears to alter the course of the reaction and results in a mixture of unreacted epoxide and highly viscous, glassy polymer, containing only insignificant amounts of polyether segments if the reactants are employed in the proportions set forth herein. Thus, when reactants derived from natural sources are employed they should advisably be low in content of any basic ash.

A slightly modified, valuable embodiment of the present invention contemplates the preparation of polyester-polyether polyols having a small increase in the average degree of polymerization in the hydroxyl-terminated terminal polyether segments. Polyols with such terminal ether segments of extended length, hereinafter referred to as chain-extended polyester-polyether polyols, possess desirably lowered viscosity and increased compatibility with halogenated solvents, such as fluorocarbon blowing agents. The amount of increase in the terminal ether segments of these chain-extended polyols varies from an average of about 0.05 1,3-oxyalkylene units per chain end up to about 2.0, and frequently not more than about 1.5, 1,3-oxyalkylene units per chain end, with the preferred value ranging from about 0.1 to 1.0 1,3-oxyalkylene units per chain end. Surprisingly, and very desirably the addition of an average of as little as 0.1 to 0.2 1,3-oxyalkylene units per chain end may decrease the viscosity of a polyester-polyether polyol by a factor of about two to five and increase the solubility of a halocarbon by about 50 to 100 percent.

The chain ends of the usual polyester-polyether polyols consist of polyether segments of the structure $-O(R'O)_nH$ where $n$ has an average value of from about 2.0 up to about 4.0 and typically of about 2.5. In the case of the lengthened polyether segments, the value of $n$ in this terminal segment ranges from about 2.05 up to about 5.5, and typically has a value of from about 2.5 up to 3.0.

The average value of the ratio of epoxide residues to anhydride residues in the unmodified polymer ranges from about 2.0 up to about 6.0, and the range of this average value for the lengthened chain polymer is raised to from about 3.0 up to about 10.

Polyester-polyether polyols having a slightly increased average degree of polymerization in their terminal polyether segments are conveniently prepared by reacting the hydroxyl-terminated polyester-polyether polyols described herein-above with saturated aliphatic terminal monoepoxides in the presence of a tertiary amine as a catalyst at superatmospheric pressures and at temperatures ranging from about 70° C. to 200° C., and advisably not more than 180° C. Other methods described in the art for the preparation of polyethers are also suitable for preparing the chain-extended polyester-polyether polyols. Terminal aliphatic monoepoxides suitable for use are those described herein-above, in particular propylene oxide and ethylene oxide.

A very satisfactory and convenient technique for producing the chain-extended polyester-polyether polyols consists in reacting first a polymerization starter, a cyclic polycarboxylic acid monoanhydride and a monoepoxide in the absence of any basic catalysts in accordance with the process described hereinabove for the preparation of polyester-polyether polyols, until the anhydride has become essentially completely reacted. Acidic end groups may or may not be present at this point. Then the amine catalyst and additional monoepoxide, if required, are added, and the epoxide is further reacted until the desired amount has become combined. It is a critical requirement that the amine catalyst not be added until the formation of the polyester-polyether polyol in the first step has been completed in order to avoid undesirable shortening of the internal polyether segments. It is also essential that the chain-extending or end-capping reaction be conducted in the absence of any substantial amount of cyclic anhydride of an organic polycarboxylic acid. If the amine catalyst and an anhydride are present together at elevated reaction temperature an undesirably dark color results.

A large number of tertiary amines may satisfactorily serve as catalysts. Suitable amines will generally contain from 3 to 21 carbon atoms and from one to three nitrogen atoms and at least one, and advisably two, and preferably, three of the hydrocarbon radicals attached to the tertiary amine nitrogen atoms will be aliphatic in nature. Examples of suitable tertiary amines are trimethylamine, triethylamine, tripropylamine, triallylamine, N-methylmorpholine, N-ethylmorpholine, tetramethyl-1,3-butanediamine, triethylene diamine, benzyldimethylamine, dimethylaminomethyl phenol, tris-(dimethylaminomethyl) phenol, and tetramethylguanidine. Particularly preferred are trimethylamine, triethylamine, and tetramethylguanidine.

The amount of amine catalyst is not critical, and may range from about 0.05 percent to about 5 percent by weight, based on the weight of the reaction mixture, with about 0.1 to 1 percent being preferred.

The components employed in the production of the polyurethane polyols are combined in amounts such as to produce a functionality, hydroxyl number, equivalent weight, and cyclic hydrocarbon radical content per kilogram of polymer within the range previously specified. To prepare the polyester-polyether polyls suitable for use in this invention the epoxide has to be employed in excess over the stoichiometric amount needed to react with the anhydride. The ratio of mols of epoxide to mols of anhydride employed will generally range from about 2:1 up to about 10:1, and will frequently vary from about 3:1 to about 6:1. The specific amounts employed will depend on the equivalent weight of the polymerization starter selected and on the polyol equivalent weight desired. The polymerization starter equivalent weight is computed by dividing the starter molecular weight by the number of groups capable of starting a polymer chain, and the polymer equivalent weight is computed as described previously. In general, from about 1/10 to 2/3 mol of anhydride and from about 1/3 to 4 mols of epoxide will be used per equivalent of starter, with the ratio of epoxide to anhydride falling within the range stated above.

It should be noted that, frequently, the amount of anhydride used is insufficient to convert more than a fraction of the original starter groups into polyester-polyether chains. Thus, frequently, from about 1/10 to about 2/3 of the functional hydroxyl groups in the polyol are attached to ester-containing chains. A large fraction of the remaining hydroxyl groups are attached to polyether chains, and a small proportion of the polyol hydroxyl groups are unreacted starter hydroxyl groups.

The amount of polymerization starter will generally range from about 10% to about 50%, and frequently to about a maximum of 35% by weight of the combined weight of the reactants. When water is used together with a higher functionality polymerization starter, the proportion of water in the starter is determined by many considerations. In general, less than about 30 percent by weight, and preferably from about 20 percent to about 5 percent by weight of the starter weight will consist of water. Thus, the maximum amount of water will generally range from about 3 percent to about 8 percent by weight of the combined reactants. Polyols prepared from such aqueous starter mixtures are useful in polyurethane castings, coatings and the like, but are unsuitable for use in the preparation of rigid polyurethane foams with optimum properties.

Mixed starters will have an average functionality which can be estimated from the individual functionalities of the components of the mixture. The average (number average) functionality of a mixture of Starter No. 1 and Starter No. 2 may be computed as follows:

$$= \frac{(\text{mols of 1}) \times (\text{functionality of 1}) + (\text{mols of 2}) \times (\text{functionality of 2})}{\text{mols of 1} + \text{mols of 2}}$$

For example, sorbitol monohydrate gives an average functionality of $(2+6)/2=4.0$, dextrose monohydrate gives an average functionality of $(2+5)/2=3.5$, and a sucrose solution containing three mols of glycerol per mol of saccharide has an average functionality of 4.25.

Both the simple and the chain-extended polyols prepared according to the process described herein and in our copending applications possess many inherent advantages making them particularly useful and suitable for the preparation of polyurethane compositions. These polyester-polyether polyols have linear hydroxyl-terminated polymer chains attached, through ester and ether linkages, to, and branched from, a central polymerization starter-derived residue. The polyols are essentially composed of (A) from about 10% to about 50% by weight of the polymerization starter residue and (B) from about 90% to about 50% by weight of (X) 1,3-oxyalkylene units of the formula —O—R'— and (Y) ester units of the formula $$-\mathrm{O-C-RING-C-}$$
$$\phantom{-O-}\mathrm{O}\phantom{-RING-}\mathrm{O}$$

in a molar ratio X/Y ranging from at least 2:1 up to about 10:1, and more frequently from about 2:1 to 6:1. These polyols are importantly characterized and distinguished from polycondensation-produced polyols by having a relatively narrow molecular-weight distribution. The ratio of the weight-average molecular weight, $\overline{M}_w$, to the number-average molecular weight, $\overline{M}_n$, e.g. $\overline{M}_w/\overline{M}_n$, of the polyurethane polyols of the present invention is generally less than 1.5, and frequently less than 1.3.

If a single polymerization starter is used, the functionality of the polyols of the instant invention is essentially uniform and equal to that of the polymerization starter used, so that the selection of the polymerization starter allows an effective control over and affords a wide choice of the polyol functionality. When a mixture of starters is used, the resulting polyol will have an effective average functionality which can be estimated from the individual functionalities and the proportions of the various starters.

If a single polymerization starter represented by the general formula $P(XH)_f$ wherein P represents the organic residue attached to the active-hydrogen containing groups capable of starting the ring-opening polymerization, X is selected from the group of oxygen and sulfur, and $f$ is the functionality of the starter, that is, the number of active-hydrogen containing groups per starter molecule, is employed, the structure of the polyether-polyesters useful in preparing the polyurethanes of the present invention may essentially be represented by the following general formula:

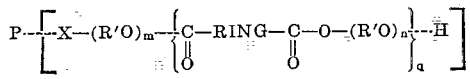

wherein P is identical with the residue P attached to the active-hydrogen containing functional groups in a polymerization starter $P(XH)_f$ selected from the group consisting of water, hydrogen sulfide, and organic compounds having at least two, and preferably three, radicals of the group consisting of hydroxyl, carboxyl, and sulfhydryl radicals, which starter reacted to initiate polymer chains and become joined thereby through ester and ether linkages to said polymer chains, X is a divalent radical selected from the group consisting of oxygen and sulfur, e.g. —O— and —S—, $f$, the functionality, is an integer having a value of at least two, and preferably at least three, R' is a saturated lower aliphatic 1,2-alkylene radical having from two to six carbon atoms and having the formula

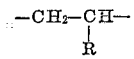

with R being a radical selected from the group consisting of hydrogen, chloromethyl, and lower alkyl radicals, RING represents a cyclic hydrocarbon radical having from six to twelve carbon atoms and from zero to six halogen substituents of the group consisting of chloro and bromo radicals, $m$ is an integer varying from zero to not more than about ten, with the average value of $m$ ranging from 0.25 to more than 2.0, $n$ is a positive integer varying from one to about ten, with the average value of $n$ varying from at least 1.5 to about 6, and preferably from about two to about four, and $q$ is an integer varying from zero to five, with the average value of $q$ for the entire polyester-polyether composition varying from 1/10 to 1, that is, the average value of $q$ will be such that the mols of RING radicals per kilogram of polyol vary from at least 0.5 to about 4.2.

The molar ratio of said 1,2-alkylene radical, R', to said cyclic hydrocarbon radical, RING, for all polyester-polyether polyols described herein will generally vary from about 2:1 to about 10:1, with the molar ratio for non-chain extended polyols falling more frequently within the range of 2:1 to 6:1. The amount of starter residue will range from about 10 percent to 50 percent by weight of the polyester-polyether polyols described herein.

The averages of $m$, $n$, and $q$ are arithmetic averages. The average value of $m$ can be computed by summing the number of 1,3-oxyalkylene units in the polyther segments attached directly to the starter residues and dividing this sum by the total number of branch chains in the polymer. The average value of $n$ is computed by dividing the sum of the 1,3-oxyalkylene units, e.g. —O—R'— units, in the polyether segments not attached directly to the starter residues by the number of these polyether segments. The average value of $q$ is computed by summing the number of polyester segments and dividing this sum by the total number of branch chains in the polymer.

In a given polyol composition the fraction of branch chains having $q$ not equal to zero, that is, the fraction of chains being essentially composed of one or more repeating units of the type

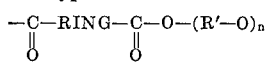

will generally constitute at least ⅒ and frequently not more than ⅔ of the total number of chains. The remainder will be made up of branch chains composed of one or more oxyalkylene groups and of the unreacted —XH groups originally attached to the starter with the latter usually constituting not more than ⅓ of the total members attached to the polymerization starter residue. These unreacted starter —XH groups will be sulfhydryl groups if a sulfhydryl-group containing starter is employed, and the linkages joining the polymer branch chains to the starter residue will consist of thioether and thioester bonds in this instance, and the term ester and ether linkage when used herein and in the claims in reference to the bonds joining the starter residue and the polymer chains shall encompass such bonds. If carboxylic acid starters are employed all starter groups will be converted into polymer chains and the polyester-polyether polyols will contain only polymer chains attached to the starter residue, with only an infinitesimal amount of free acid groups remaining.

In preferred compositions R' is selected from the group consisting of 1,2-ethylene, 1,2-propylene, 1,2-butylene, and 3-chloro-1,2-propylene, and the cyclic hydrocarbon radical, —RING—, is selected from the group consisting of 1,2-phenylene, 3,4,5,6-tetrachloro-1,2-phenylene, 3,4,5,6-tetrabromo-1,2-phenylene, 2,2'- biphenylene, 3,4,5,6- tetrahydro - 1,2 - phenylene, and 1,4,5,6,7,7-hexachlorobicyclo-(2,2,1)-2,3-heptenylene-5.

It is apparent from the foregoing discussion that the functionality, molecular weight, hydroxyl number, and equivalent weight of the polyester-polyether polyols used as components in the polyurethane compositions of the present invention can be readily controlled, as desired, by selecting the appropriate polymerization starter, and the proportions of anhydride and epoxide.

The described polyester-polyether polyols are useful in combination with polyisocyanates to prepare the polyurethanes of the present invention in the form of hard, tough coatings; rigid, tough castings; and, particularly, rigid, tough, nonelastic foams which have slow recovery properties. By employing such reactants as tetrachlorophthalic anhydride, tetrabromophthalic anhydride, or chlorendic anhydride or epichlorohydrin, fire-resistant polyurethane compositions can be prepared without the use of special additives. Useful polyurethane compositions are prepared from polyols having equivalent weights ranging from about 80 to about 250, and occasionally to about 300. The equivalent weights of polyether-polyester polyols based on such starters as aliphatic polyols and non-halogenated cyclic hydrocarbon radicals will usually range from about 80 to somewhat more than 150, polyester-polyether polyols derived from such high-functionality starters as sucrose or dextrin-polyol mixtures, or polyols derived from halogenated anhydrides such as tetrachlorophthalic anhydride will frequently have equivalent weights falling within the upper portion of the equivalent weights of more than 150 can be used to presirable feature of the present invention that polyols with equivalent weights of more than 150 can be used to prepare rigid foams having excellent physical properties. The foams prepared from such high-equivalent weight polyols bear a striking resemblance to balsa wood in appearance and are especially tough and resistant to mechanical abuse in contrast to present materials which are brittle and fragile. Such polyurethanes are very suitable for use as boardstock. The high-functionality, high-equivalent-weight polyols are also useful as blending materials with low-equivalent-weight, low-viscosity polyurethane polyols known to the art. In comparison to prior art compositions, the instant polyurethanes are less expensive, exhibit less yellowing upon exposure, possess better hydrolytic stability and better humid aging characteristics.

The polyurethane compositions are prepared from the above described polyester-polyether polyols and organic polyisocyanates by mixing and reacting these materials in accordance with the standard techniques known to the art. For example, references which disclose the preparation of polyurethane foams, and the suitable materials for such preparation are U.S. Patents 2,779,689; 2,785,739; 2,787,601; 2,788,335; 3,079,350; and the bulletin "Rigid Urethane Foams, II, Chemistry and Formulation" by C. M. Barringer, HR–26, Elastomer Chemicals Department, E. I. du Pont Co., April 1958, and the books by J. H. Saunders and K. C. Frisch "Polyurethanes, Chemistry and Technology," Interscience, N.Y., N.Y., 1962.

Polyurethane compositions are suitably prepared by mixing and reacting polyester-polyether polyols having a uniform functionality of at least three with a polyisocyanate having at least two isocyanato groups. In general, somewhat better physical properties result when isocyanates having a functionality of more than two are used. Suitable polyurethane compositions may also be prepared by reacting a polyester-polyether polyol having a functionality of at least two and preferably 2.5, with polyisocyanates having an average functionality of at least 2.5, and preferably three.

The polyisocyanates employed in the preparation of the polyurethane compositions are organic polyisocyanates having at least two reactive isocyanato groups, e.g., having a functionality of at least two. Representative of the polyisocyanates which can be used are such compounds as 2,4-tolylene diisocyanate, 2,6-tolylene diisocyanate, crude tolylene diisocyanates, 1,4-phenylene diisocyanate, 1,3-phenylene diisocyanate, 1,5-naphthylene diisocyanate, 4,4'-diphenylene diisocyanate, 3,3'-dimethyl-4,4'-diphenylene diisocyanate, 4,4'-diisocyanato diphenylmethane, and 4,4',4"-triisocyanato triphenylmethane. Other useful polyisocyanates are polymethylene polyphenylisocyanates produced by phosgenation of multifunctional condensation products of aniline and formaldehyde. One such product is PAPI which is a dark somewhat viscous liquid aromatic polyisocyanate containing both ortho and para substitution according to the formula:

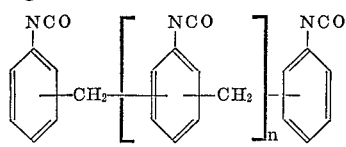

where $n$ has an average value of 1. The molecular weight is about 384 and the average number of isocyanato groups per molecule is 3.03. A similar product is known in the trade as Mondur MR. Polyisocyanates made by reacting trimethylolpropane or similar polyols with tolylene diisocyanates may also be used. Aromatic diisocyanates are especially useful. Mixtures of polyisocyanates may advantageously be used.

The polyurethanes are produced by reacting the polyesterpolyether polyols with the organic polyisocyanate under conditions generally used to form polyurethanes. Depending on the particular polyurethane formulation, the polyol-polyisocyanate reaction mixture will also desirably contain other conventional ingredients, such as one or more catalysts, surfactants, blowing agents, pigments, stabilizing agents or other additives. Such other components are employed in the standard amounts generally used in the preparation of polyurethanes, with the exception that less catalyst may be required for the polyurethanes of this invention since the polyester-polyethers described herein tend to be more reactive than conventional polyethers. Smaller than standard amounts of surfactants are also frequently sufficient in the preparation of the polyurethanes of this invention.

Any of the conventional catalysts employed in polyurethane technology can be used as warranted. Some examples of useful catalysts which can be employed are tertiary amines, such as tetramethyl-1,3-butanediamine, triethylene diamine, triethanolamine, N-methylmorpholine, N-ethylmorpholine, tribenzylamine, N,N-dimethylbenzylamine, as well as tin compounds, such as dibutyl tin dilurate, stannous oleate, stannous octoate, and others.

Conventional blowing agents, which vaporize at or below the temperature of the foaming mass, such as halohydrocarbons exemplified by fluorotrichloromethane (hereinafter referred to as Freon-11), stabilized fluorotrichloromethane (hereinafter referred to as Freon-11B) and dichlorodifluoromethane are used in preparing the rigid foams. Other known blowing agents, such as butane, may also be employed.

Any of the various types of surfactants known to be useful in the preparation of cellular polyurethanes may be employed in the process of preparing polyurethane foams according to this invention. Examples of suitable surfactants are castor oil sulfonate, ethylene oxide adducts of sorbitol mono-esters of long-chain fatty acids, ethylene oxide adducts of alkyl phenols, polydimethylsiloxanes, and especially ethylene oxide adducts of polydimethylsiloxanes. These latter compounds, and similar block copolymers of polyglycols and dimethylsiloxane are especially useful for this purpose. U.S. Patent 2,834,748 describes such especially suitable water-soluble organo-silicone copolymers for use as emulsifying agents. Examples of useful commercially available organo-silicones are DC–113, DC–193, X–520, and Silicone Fluid 199.

In the preparation of rigid polyurethane foams it is possible to use the so-called "one-shot" method in which all ingredients of the formulation are combined in one step, or one may employ the prepolymer technique wherein the polyisocyanate is partially prereacted with the polyol. In addition to obviously being usable in prepolymer and semi-prepolymer-type systems, the instant polyols are particularly well suited for one-shot foaming because of their specific combination of relatively high equivalent weight, low viscosity, and good reactivity.

Because of the special qualities inherent in the polyester-polyether components of this invention polyurethane formulations are obtained which are nonresilient and tough and which give rigid foams, hard coatings and rigid solid castings. Such desirable polyurethanes can be obtained with the use of not more than 60% and frequently not more than 30% by weight of polyisocyanate based on the weight of the combined mixture of polyester-polyether and polyisocyanate. Higher amounts can be used but often are not necessary. Furthermore, the polyisocyanate content often can be reduced to 25%, and even 20%, and sometimes to even less than 15% by weight of the total weight of the polyurethane, the products retaining good stiffness as well as other desirable properties. In general, satisfactory amounts of polyisocyanate will range from about 60 percent, and preferably from about 50 percent to not less than 10 percent by weight of the combined weight of the polyol-polyisocyanate reactants.

It is instructive to compare rigid polyurethane foams of the instant invention with polyurethane foams made from pure polyethers, such as polypropylene oxide polyethers, employing 2,4-tolylene diisocyanate in both instances. The comparison is particularly striking if the propylene oxide adducts of sorbitol are used as a basis for comparison. These sorbitol-based polyethers are much in favor because of the good physical properties of the rigid foams made from them. The table following lists the isocyanate content and properties of sorbitol-based polyether polyol urethane foams, as described by the manufacturer.

TABLE

| Polyol equivalent weight | Polyol hydroxyl number | TDI Content of foam, percent | Properties of polyurethane |
|---|---|---|---|
| 115 | 490 | 43 | Good properties in rigid foam, good humid aging. |
| 146 | 385 | 37 | Useful where properties of rigid foam are not of prime importance, acceptable humid aging. |
| 200 | 280 | 30 | Semi-rigid foams and elastomers, poor humid aging. |
| 350 | 160 | 20 | Semi-rigid and resilient formulations. |
| 560 | 100 | 13 | Resilient formulations only. |

As shown in the subsequent examples, the polyester-polyether copolymers of this invention give rigid foams with good physical properties down to a TDI content of about 20% and can be produced with even less TDI. It is clear that the instant polymers give rigid formulations at much lower isocyanate content than can be used with conventional polyether polyols. The savings in isocyanate content are as much as about 20% by weight.

According to a hypothesis which we have made, but to which we do not intend to be bound, the cyclic ring structure incorporated into the main polymer chains result in a stiff back-bone polymer chain which is capable of partially assuming the network stiffening effect normally provided by a larger polyisocyanate content in previous polyurethane compositions.

In general, the polyurethane foams produced with the novel polyester-polyether polyols and a polyisocyanate have a modulus in excess of 5 p.s.i. and frequently in excess of 20 p.s.i. for a 20% deflection in compression, and a yield point of more than 10 p.s.i. in compression, when made into a foam having a bulk density of 2.0 pounds per cubic foot.

The dimensional stability of humid aging at 158° F. (70° C.) and 100% relative sumidity of the preferred embodiments of the present invention compare very favorably with those of the rigid polyurethane foams in present commercial use. Many of the foams of the present invention have volume increases of less than 10 percent when a 2.0 pound-per-cubic-foot foam is aged for twenty days at 70° C. and 100% relative humidity, and certain of these foams have volume increases of only about 5% under comparable conditions. Similarly low volume changes are found at foam densities of about 1.7 pounds per cubic foot or even less. It is particularly unexpected that polyurethane foams prepared from polyols having equivalent weights ranging as high as about 225 show volume changes of less than 10% on aging for 25 days or longer at 70° C. and 100% relative humidity. By comparison, a sorbitol-based polyoxypropylene polyether having an equivalent weight of 125 when reacted with polyphenylene polyisocyanate yields a 2.0 pound-per-cubic-foot foam which has a 9% volume increase after 20 days exposure and a methyl glucoside-polyoxypropylene polyether having an equivalent weight of 155 results in a 2.0 p.c.f. foam exhibiting a volume increase of 15% under identical conditions.

The use of the polyester-polyether polyols is particularly useful in the preparation of polyurethane castings. In the preparation of polyurethane castings it is necessary that the polyols have an extra low acid number such as 2 or less (5 is considered a maximum high) and a water content of 0.02% or less. To prepare such polyester-polyether copolymers, having the required low acid number and water content, by conventional technique is particularly troublesome, difficult and expensive. However, polyester-polyethers having the necessary extra low acid number and water content are formed directly by our novel process employed in the preparation of the polyester-polyether polyols, since water is not formed in our process. These polyols allow the preparation of such castings in a novel one-step process, in contrast to the conventional multistep method in use at present. In addition, polyurethane castings based on the novel polyols can be prepared with a lower polyisocyanate content and do not require any curing agent.

In the formation of polyurethane castings the polyester-polyethers and polyisocyanate are combined and, without a catalyst, can be cured at about 70 to 150° C. to a solid product. When a catalyst such as a tertiary amine or a tin catalyst is used, curing can be achieved at room temperature.

The polyurethane compositions of the instant invention also serve well as tough, hard, adherent coatings in a number of applications. Specifically, these polyurethanes form excellent protective coatings for wood surfaces subjected to abrasion and impact, such as floors, furniture, and bowling alleys. They also form excellent protective coatings for metal substrates subjected to bending, abrasion, or chemical attack. The polyurethane coating compositions can be applied to such surfaces by any of the conventional fluid coating techniques such as, for example, spray, dip, brush, knife and roller coating. The compositions may be diluted with solvents such as lactones, ketones, esters, ethers, and others, and pigments and other additives may be added, if desired. In general, the solvent-diluted compositions are coated onto the substrate, then dried and cured at room temperature or elevated temperature. The cured coating compositions are hard, flexible, abrasion-resistant and chemically inert and exhibit excellent adhesion.

The following examples are presented to illustrate, but not to limit, the invention.

EXAMPLE 1

This example describes attempts to prepare (A) by polycondensation and (B) by incremental addition of an epoxide to a mixture of an anhydride and a polyol, a normal polyester polyol suitable for use in preparing polyurethanes by standard techniques.

(A) Phthalic anhydride, 98.8 grams, glycerol, 30.5 grams, and ethylene glycol, 41.8 grams, are heated together, while the water of condensation is removed continuously as distillate, for four hours at 200–250° C. The viscosity of the resulting product is about 10,000,000 to 100,000,000 centipoises at room temperature. Although this polyol has an average functionality of about 3 and an average equivalent weight of about 150—which are the values found to be very suitable for preparation of a polyurethane from the novel polyester-polyether polyols as described by this invention—the glassy solid product is totally unsuitable for use in preparing polyurethane compositions by conventional techniques.

(B) In a 300 ml. three-necked flask fitted with a thermometer, dropping funnel, stirrer, and a Dry Ice condenser are combined 176.0 grams of phthalic anhydride and 54.8 grams of glycerol. The temperature is raised to about 150° C. and 69.7 grams of propylene oxide are added dropwise over a period of 4¾ hours while a reflux of propylene oxide and a temperature of about 150° C. are maintained. After completion of the epoxide addition the reaction mixture is heated for an additional thirty minutes at 150° C. On cooling the mixture solidifies to a glassy solid which has a viscosity of much greater than 1,000,000 centipoises at room temperature. The equivalent weight is about 170, and the functionality is 3.

By comparison, a polyester-polyether polyol prepared according to the teachings of the present invention and having comparable functionality and equivalent weight has a viscosity of less than 100,000 centipoises, illustrating the considerable advantages of the present invention.

EXAMPLE 2

This example illustrates the foaming of a mixed polyester-ether.

Phthalic anhydride, propylene oxide, and glycerol are first reacted to give a mixed polyester-polyether.

Phthalic anhydride (41.1 grams), propylene oxide (55.4 grams) and glycerol (12.3 grams) are placed together into a thick-walled glass tube which is then sealed. The tube is thoroughly shaken to mix the contents and is then placed into an oven. The tube is heated at 105° C. for 20 minutes, 127° C. for 25 minutes, 155° C. for 45 minutes, 168° C. for 40 minutes, and 178° C. for 30 minutes. The hot polymer is fluid, and some unreacted propylene oxide condenses in the top of the tube on cooling. The polymer is fairly viscous when cool and has an acid number of 8. To prevent loss of unreacted epoxide the reaction tube is opened only after cooling, care being taken to assure that most of the unreacted epoxide remains in the polymer. The tube is resealed and reheated at 170° C. for 100 minutes. The polymer becomes much more viscous, and has an acid number of less than 2. The calculated equivalent weight is 271.

A polyurethane foam is made by a conventional one-shot technique. The polyester-polyether (24.3 grams) is mixed with 0.6 gram of fluorotrichloromethane (Freon-11), five drops of a block copolymer of ethylene oxide and dimethylsiloxane, two drops of tetramethyl-1,3-butanediamine, and five drops of dibutyltin dilaurate. Then 2,4-tolylene diisocyanate (10.0 grams) is added and the mixture stirred. The mixture foams well and gels at the proper time. The foam is then cured at 80° C. for 30 minutes. The foam is rigid and has a high elongation. The density of the foam is seven pounds per cubic foot.

The tolylene diisocyanate content of the above foam is 28% on a weight basis.

EXAMPLE 3

This example illustrates the preparation of a polyurethane foam from a phthalic anhydride-butylene oxide-glycerol polyester-polyether.

Phthalic anhydride (40.9 grams), 1,2-butylene oxide (55.8 grams) and glycerol (12.4 grams) are placed together into a heavy-walled glass tube which is then sealed. The tube is thoroughly shaken to mix the contents, and it is then heated at 113° C. for 70 minutes. The tube is then shaken again until the contents are homogeneous, and heated at 173° C. for 280 minutes. The polymer is very viscous on cooling and shows no evidence of unreacted epoxide. The acid number is about 5, and the calculated equivalent weight is 270.

This polymer is a polymeric ester of phthalic acid, 1,2-butylene glycol and polybutylene glycols, glycerol, and mixed adducts of 1,2-butylene oxide and glycerol.

The foam is prepared by the conventional one-shot procedure. The polyester-polyether polymer (24.8 grams) is mixed with Freon-11 (1.1 grams), five drops of a block copolymer of ethylene oxide and dimethylsiloxane, two drops of tetramethyl-1,3-butanediamine, and five drops of dibutyltindilaurate. Then 2,4-tolylene diisocyanate (9.9 grams) is stirred in. The mixture foams well, but gels slowly. The foam is cured for 30 minutes at 80° C. The foam is rigid and tough, but has a brittle skin. It has a bulk density of 9 pounds per cubic foot.

The tolylene diisocyanate content of the above foam is 27% on a weight basis.

EXAMPLE 4

This example illustrates the preparation of a polyurethane foam from a high-functionality polyester-polyether made from phthalic anhydride, propylene oxide and sorbitol.

Phthalic anhydride (43.7 grams), propylene oxide (50.5 grams), and 6.6 grams of sorbitol are placed into a heavy-walled glass tube and the tube is then sealed. The tube is heated for 40 minutes at 120° C., and the sorbitol melts, but forms a dense second liquid phase. The tube is further heated at 132° C. for 20 minutes and at 148° C. for 60 minutes. At this point the sorbitol has all dissolved, and the tube is then heated at 167° C. for four hours. The polymer is fluid when hot, and the hot polymer evolves unreacted epoxide when the pressure is released by opening the tube. The acid number is about 2, and the cold polymer is quite viscous. The calculated equivalent weight is about 460. This polymer is hexafunctional, in contrast to the trifunctional polymers based on glycerol.

The foam is prepared by the conventional one-shot procedure. Mixed polyester-polyether (20.2 grams) is mixed together with Freon-11 (1.1 grams), five drops of ethylene oxide-dimethylsiloxane block copolymer, two drops of tetramethyl-1,3-butanediamine, three drops of dibutyltindilaurate and three drops of water. Then 2,4-tolylene diisocyanate (5.9 grams) is mixed in, and the mixture foams and gels quickly. The foam is cured for thirty minutes at 80° C. This foam is rigid. It has a bulk density of 3 pounds per cubic foot and a compressive load of 10 p.s.i. gives no measurable deflection (the estimated deflection is 1% or less). When compressed, the foam has slow and incomplete recovery.

This foam is of particular interest since the diisocyanate content is only 21% by weight.

EXAMPLE 5

This example illustrates the preparation of a polyurethane foam having a very low diisocyanate content.

Phthalic anhydride (40.3 grams), pyromellitic dianhydride (3.3 grams), sorbitol (3.8 grams), and propylene oxide (50.3 grams) are placed into a heavy-walled glass tube, and the tube is sealed. The contents are mixed, and the tube is heated at 134° C. for 20 minutes. At the end of this time the tube is shaken until the contents become homogeneous. The tube is then further heated at 145° C. for 25 minutes, 167° C. for 85 minutes, and 175° C. for 310 minutes. At the end of this time the tube is opened, and the acid number of the polymer is 1.7. The hot polymer evolves a small amount of volatiles, indicating that a small amount of epoxide is still present. The cooled polymer is extremely viscous. The calculated equivalent weight is 780.

To 21.2 grams of the above polyester-polyether is added several grams of Freon-11, and the mixture is stirred until it is homogeneous. All but 2.9 grams of the added Freon-11 have volatilized. Then 5 drops of ethylene oxide-dimethylsiloxane block copolymer, two drops of tetramethyl-1,3-butanediamine, and five drops of dibutyltin dilaurate are added and stirred in. Then 2,4-tolylene diisocyanate (3.0 grams) is added and stirred in. The mixture foams readily, and gels satisfactorily. The foam is cured at 100° C. for 45 minutes. After cooling for one hour, the foam has shown no shrinkage, and is semirigid, with a bulk density of about 4 pounds per cubic foot. A compressive load of 25 p.s.i. gives about 3–4% deflection. This foam is particularly interesting, since the diisocyanate content is only 11% by weight.

EXAMPLE 6

This example illustrates the reaction of polyester-polyether of low acid number (prepared by a two-step procedure) with tolylene diisocyanate to give a rigid polyurethane foam with good toughness and elongation.

Preparation of polyester-polyether

In a 5-liter, 3-neck flask fitted with mechanical stirrer, thermometer and take-off condenser, are placed 847 grams of phthalic anhydride, 334 grams of trimethylol ethane, and 743 grams of triethylene glycol. The flask is heated until the contents are molten, and stirring is started. The temperature is raised over the space of an hour to 190–200° C., and maintained at this level for 8 hours with the water of condensation distilling over during this time. The polyester-polyether is then cooled. It is a viscous, slightly yellow fluid, with an acid number of 25.

To 114.2 grams of the above ester is added 14.6 grams of 1,2-butylene oxide. This is a 300% excess of oxide, based on the acid content of the polymer. The mixture is placed in a large, thick-walled glass tube which is sealed. The tube is placed in an oven, heated to 183° C. for 4½ hours, and is then cooled. The product has not changed in appearance, and contains some unreacted butylene oxide. The acid number of this treated polymer is less than 1.5.

Preparation of foam

A conventional one-shot procedure is used. In a paper cup are placed 47.0 grams of the above polyester-polyether, having an acid number of less than 1.5, 0.3 gram of chloroform, ten drops of dibutyltin dilaurate, ten drops of a block copolymer of ethylene oxide and dimethylsiloxane, ten drops of tetramethyl-1,3-butanediamine, and the mixture is stirred until it is homogeneous. Then, 2,4-tolylene diisocyanate (19.6 grams) are added and stirred in. The resulting mixture foams furiously, and gels quickly. The foam is cured at 90° C. for 20 minutes. This foam has a low density, about 5 pounds per cubic foot, and is very tough and resistant to shock.

The tolylene diisocyanate content of the above foam is 29% on a weight basis.

EXAMPLE 7

This example illustrates the preparation of a polyurethane foam from an aromatic polyester and 2,3-tolylene diisocyanate. A two-step process was employed so as to give a good foam.

Preparation of polyester-polyether

Isophthalic acid (983 grams), trimethylol ethane (362 grams), and triethylene glycol (784 grams) are combined in a 5-liter 3-neck flask equipped with stirrer and condenser. The mixture is heated until the isophthalic acid is all dissolved, the stirring started, and the temperature is then raised quickly to 180° C. The temperature is maintained at 180–195° C. for nine hours, the water of condensation distilling over. The polyester-polyether is then cooled and has an acid number of 30.

Preparation of foam

A prepolymer is prepared from the above polyester-polyether by mixing 31.0 grams of polyester-polyether with 38.1 grams of 2,4-tolylene diisocyanate (TDI). The mixture becomes hot, and evolves a considerable amount of carbon dioxide. As the mixture cools, it is quite viscous.

A masterbatch of the polyester-polyether is prepared by mixing together 46.1 grams of polyester-polyether, 2.3 grams of chloroform, ten drops silicone oil, and ten drops dibutyltin dilaurate. The mixture is then stirred and 40.9 grams of the warm prepolymer are added and stirred in. The mixture foams very slowly, and is cured for 40 minutes at 80° C. The foam is stiff, but not brittle, and shows no shrinkage on cooling or standing. The above foam contains 20% TDI on a weight basis.

EXAMPLE 8

This experiment illustrates the foaming of a rigid backbone polyester (prepared by a two-step procedure) with TDI.

Preparation of polyester-polyether

The polyester-polyether derived from phthalic anhydride-triethylene glycol-trimethylol ethane, and prepared as in Example 6 was mixed thoroughly with 7% of its own weight of propylene oxide. This is a 170% excess of propylene oxide. The mixture was then placed into a loosely stoppered flask and heated slowly to 119° C. over a period of 4½ hours. The acid number of the product was found to be 12.

Since unreacted propylene oxide seemed to be present the temperature of the polyester-polyether was raised from 119° C. to 144° C. over a period of one hour. The acid number was found to be 8 at this point, and no excess propylene oxide was present.

Preparation of foam

The above polyester-polyether with an acid number of 8 was foamed using a two-package system. A prepolymer was prepared by reacting together 21.9 grams of polyester-polyether and 25.4 grams 2,4-tolylene diisocyanate (TDI). The mixture underwent an exothermic reaction, and gave off a considerable amount of carbon dioxide.

A masterbatch was prepared by mixing together 23.3 grams of polyester-polyether, 1.8 grams of chloroform, five drops of tetramethyl-1,3-butanediamine, ten drops of ethylene oxide-dimethyl siloxane copolymer, and ten drops of dibutyltin dilaurate. To this masterbatch was added 35.4 grams of the above prepolymer. The mixture was stirred, and foamed at a convenient rate. The foam was cured at 100° C. for 30 minutes, and showed no shrinkage on cooling.

The above foam contains 27% TDI on a weight basis.

EXAMPLE 9

This example illustrates the preparation of a polyurethane foam from a rigid backbone polyester-polyether (prepared by a two-step procedure) and 2,4-tolylene diisocyanate.

Preparation of polyester-polyether

Phthalic anhydride (828 grams), glycerol (270 grams) and diethylene glycol (522 grams) were placed into a 5-liter, 3-neck flask fitted with stirrer, thermometer and take-off condenser. The mixture was heated until all the phthalic anhydride had dissolved, and the stirring was started. The temperature was then raised quickly to 180° C., and maintained at 180–186° C. for a period of six hours, the water of condensation distilling off. The polyester-polyether is a viscous lisuid with an acid number of 52.

The acid number of the above polyester-polyether is reduced by reacting it with 48.9 grams of propylene oxide for 160 minutes at 123–131° C. The final product has an acid number of 23.

Preparation of foam

A total of 42.5 grams of the above polyester-polyether having an acid number of 23 is reacted with 60.8 grams of 2,4-tolylene diisocyanate. The mixture becomes warm and evolves a considerable quantity of gas. This prepolymer is allowed to stand until the gas evolution has stopped, and becomes cooler.

To 19.9 grams of the polyester-polyether of acid number 23 is added 1.6 grams of chloroform, five drops each of tetramethyl-1,3 - butanediamine, dibutyltin dilaurate, and silicone-polyethylene glycol block copolymer. Then, 18.0 grams of the above prepolymer are added and stirred in. The mixture foams very slowly, and is cured for two hours at 80° C. The foam is rigid and not brittle. However, it is not as tough as the corresponding foams using triethylene glycol in the polyester.

The TDI content of the above foam is 18.5% by weight.

EXAMPLE 10

This example illustrates the preparation of a two-package polyurethane surface coating from TDI and a mixed polyester-polyether from phthalic anhydride and propylene oxide.

The mixed polyester-polyether used in the same as the one used to prepare the rigid polyurethane foam of Example 5. The polymer, 7.0 grams, is dissolved in 8.3 grams of methyl isobutyl ketone which has been dried by distillation from calcium hydride. Then 1.3 grams of 2,4-tolylene diisocyanate is added, and mixed in. The resultant mixture is then immediately coated onto a sheet of tin-plated steel, and also onto a sheet of plate glass, using a Boston-Bradley Blade, set at a 4-mil gap. The coated sheets are allowed to stand under room conditions for 4 hours, and then baked for 30 minutes in a 100° C. air oven.

The cured coatings have a Sward hardness of about 50 and are very tough. The coating on the tin plate does not separate from the metal, even when the plate is bent sharply on itself.

EXAMPLE 11

This example illustrates the preparation of a one-package, air-moisture-curing, polyurethane surface coating from a mixed polyester-polyether of phthalic anhydride and propylene oxide.

The polyester-polyether is the one prepared in Example 2. The polymer, 5.6 grams, is dissolved in 6.5 grams of methyl isobutyl ketone which has been previously dried by distillation from calcium hydride. Then 5.8 grams of 2,4-tolylene diisocyanate is added, and the mixture stirred and allowed to stand. The mixture gradually becomes more viscous over the space of several days. When the mixture attains a satisfactory viscosity, it is coated upon a sheet of plate glass and also onto a sheet of tin-plated steel, using a Boston-Bradley Blade with a 4-mil setting. These coatings are then allowed to cure for 4 days under room conditions. The cured coatings have a Sward hardness of about 60 and are very tough and adherent.

EXAMPLE 12

This example illustrates the preparation of a polyurethane casting resin from the polyester-polyether described in Example 5 and derived from phthalic anhydride, pyromellitic dianhydride, propylene oxide and sorbitol.

The polyester-polyether polymer (6.4 grams), is heated at 160° C. for one hour to drive off volatile components. The polymer is then cooled and 0.7 gram of 2,4-tolylene diisocyanate are added and mixed in with slight warming. The resulting mixture is heated at 100° C. for one hour and then at 160° C. for one additional hour. The product is a very stiff, tough casting which is not glassy.

EXAMPLE 13

This example illustrates the preparation of a polyurethane foam from a polyol based on chlorendic anhydride.

Chlorendic anhydride (30.5 grams), glycerol (4.6 grams), and propylene oxide (13.1 grams) are combined in a heavy-walled glass tube. The glass tube is sealed and heated at 78° C. for one hour and 45 minutes. The product is a very viscous, nearly colorless polyester-polyether polymer with an acid number of 2.5.

To 18.6 grams of this polyester-polyether polymer are added 1.2 grams of Freon-11, five drops of a block copolymer of ethylene oxide and dimethylsiloxane, two drops of tetramethyl-1,3-butanediamine, and five drops of stannous octoate. The mixture is stirred, and then 4.0 grams of 2,4-tolylene diisocyanate are added and stirred in. The resulting foam is cured at 100° C. for 40 minutes. There is some shrinkage upon cooling. The product is a stiff, tough foam.

EXAMPLE 14

This example illustrates the preparation of a polyurethane foam from a polyester-polyether containing tetrabromophthalic anhydride.

Tetrabromophthalic anhydride (6.2 grams), phthalic anhydride (38.9 grams), sorbitol (6.8 grams) and propylene oxide (44.1 grams) are sealed together in a thick-walled glass tube. The contents are heated at 164° C. for three hours with intermittent shaking. The product has an acid number of less than two. The calculated equivalent weight is 428.

To 21.3 grams of the above polymer are added 0.8 gram of Freon-11, five drops of a block copolymer of ethylene oxide and dimethylsiloxane, two drops of tetramethyl-1,3-butanediamine, five drops of stannous octoate, and three drops of water, and the mixture is stirred. Then 6.1 grams of 2,4-tolylene diisocyanate are stirred in. The resulting foam is cured at 90° C. for 30 minutes.

The cooled product is rigid and tough, and if set afire by a bunsen burner is self-extinguishing upon removal of the burner.

EXAMPLE 15

This example illustrates the preparation of a polyurethane foam from a polyester-polyether containing tetrahydrophthalic anhydride.

Tetrahydrophthalic anhydride (36.9 grams), sorbitol (9.3 grams) and propylene oxide (37.3 grams) are sealed together in a heavy-walled tube. The reaction mixture is heated at 171° C. for four hours with intermittent shaking. The polyester-polyether product has an acid number of less than three. The calculated equivalent weight is 272.

The above polyester-polyether, 19.6 grams, is mixed together with 0.7 gram of Freon-11, five drops of a block copolymer of ethylene oxide and dimethylsiloxane, two drops of tetramethyl-1,3-butanediamine, five drops of stannous octoate, and three drops of water. Then 6.8 grams of 2,4-tolylene diisocyanate are stirred in. The resulting foam is then cured for 40 minutes at 85° C. The cooled foam is tough and rigid.

EXAMPLE 16

This example illustrates the preparation of a self-extinguishing polyurethane foam from a polyol containing phosphoric ester linkages.

Phthalic anhydride (46.0 grams), 85% phosphoric acid (5.3 grams), and propylene oxide (66.3 grams) are sealed together in a heavy-walled glass tube. The tube is cooled in an ice-bath until sealed. The reaction mixture is then heated at 130° C. for four hours. The product has an acid number of less than two.

The above ester (23.2 grams) is mixed with 2,4-tolylene diisocyanate (12.3 grams). This prepolymer is allowed to stand for three hours.

In another container 12.1 grams of the polymer is mixed with 1.1 grams of Freon-11, five drops of a block copolymer of ethylene oxide and dimethylsiloxane, two drops of tetramethyl-1,3-butanediamine, and three drops of stannous octoate. Then 12.1 grams of the prepolymer is stirred in. The resulting foam is cured at 95° C. for 40 minutes. The final product is fairly rigid, tough, and is immediately self-extinguishing.

EXAMPLE 17

This example illustrates the foaming of a mixed polyester-polyether copolymer having a functionality of over 20.

Beta-cyclodextrin is dried at 115° C. for about one hour. To 9.4 grams of this dried material in a heavy-walled glass tube is added 45.9 grams of phthalic anhydride and 49.3 grams of propylene oxide and the tube is sealed. The tube is then heated at 165° C. for 75 minutes and at 176° C. for 160 minutes, with intermittent shaking. The solid cyclodextrin has nearly all dissolved after 100 minutes of heating. The polyester-polyether copolymer is viscous at oven temperature and contains some unreacted epoxide. The acid number is 0.5.

To 9.9 grams of the polyester-polyether polymer is added 0.8 gram of chlorotrifluoromethane, four drops of ethylene oxide-dimethyl siloxane copolymer, four drops of tetramethyl-1,3-butanediamine, and 2.0 grams of 2,4-tolylene diisocyanate. The mixture foams on stirring and is cured at 100° C. for 30 minutes. The product is a stiff foam, which is fairly stiff even at 100° C. and shows no shrinkage on cooling. The density is about seven pounds per cubic foot, and the cell size is rather large.

The above foam has a TDI content of only 15% by weight.

EXAMPLE 18

Phthalic anhydride, 7760 grams, propylene oxide, 15,500 grams, and glycerol, 6140 grams, are placed in a 5-gallon nominal volume agitated, cooled autoclave. The autoclave is sealed and the temperature is raised to 130° C., at about which point an exothermic reaction is initiated. The cooling is started when the temperature reaches 150° C., and the temperature is maintained in the range of 150–160° C. for a period of 4 hours.

The product is glass clear, has an acid number of less than 1, a hydroxyl number of 382, and an equivalent weight of 147, and has a viscosity of 16,000 centipoises at 25° C. as measured with a Brookfield viscosimeter.

To prepare a one-shot rigid foam formulation from the above polyol, 300 grams of the polyol, 99 grams of stabilized trichlorofluoromethane (Freon 11B), 3.0 grams of tetramethyl-1,3-butanediamine, 10.0 grams of a block copolymer of ethylene oxide and dimethylsiloxane, and 305 grams of a polyfunctional polyisocyanate derived by the phosgenation of the condensation product of aniline with formaldehyde (Mondur MR), are mixed together with a power stirrer. The mixture has a 20 second lag after stirring before bubbles start to form (a 20 second cream time) and it takes 90 seconds before the foam reaches its final volume (a 90 second rise time). The product is a rigid foam having a density of 1.65 pounds per cubic foot. The foam has only slight shrinkage on cooling and exhibits a slight surface friability. The compressive strength parallel to the rise is 31 p.s.i., and the volume increase after exposure to 100% relative humidity and 158° F. for 12 days is only 10%.

Another polyol was prepared in the same fashion as described above except that the reactant proportions consisted of 3880 grams of phthalic anhydride, 7760 grams of propylene oxide, and 4910 grams of 1,2,6-hexanetriol. The equivalent weight and viscosity of the polyol and the properties of the rigid foam prepared therefrom are virtually identical to those of the above foam.

EXAMPLE 19

The polyol was made in a fashion similar to that used in Example 18, except that the materials used were 450 grams of demineralized water, 1220 grams of crystalline anhydrous sorbitol, 3885 grams of phthalic anhydride, and 7770 grams of propylene oxide. Again the product resembles closely that of Example 18 in equivalent weight, hydroxyl number, color, viscosity, and results on foaming.

EXAMPLE 20

The polyol is prepared in a fashion similar to that of Example 18. The materials used are dextrose hydrate (U.S.P. dextrose), 3320 grams, phthalic anhydride, 6880 grams, and propylene oxide, 12,500 grams. The temperature is not allowed to rise above 145° C., and the reaction time is 6 hours. The product is golden yellow and has a viscosity at room temperature in the order of 20,000 centipoises, and has an acid number of 0.9. The equivalent weight is 191.

This polyol, 300 grams, is mixed with 100 grams of Freon 11B, 3 grams of tetramethyl-1,3-butanediamine, 10 grams of a block codolymer of ethylene oxide and dimethylsiloxane, and 235 grams of polyphenylene polyisocyanate (PAPI). The mixture foams in a manner similar to Example 18, and the resulting foam is similar to that of Example 18, except that the compressive strength is somewhat lower, and the volume increase on humid aging is somewhat greater.

EXAMPLE 21

The polyol is made in a fashion similar to that used in Example 18, except that a 1-liter nominal volume pressure vessel is used. The materials used are 134 grams of sucrose, 21.6 grams of demineralized water, 280 grams of phthalic anhydride, and 496 grams of propylene oxide, and the reaction time is 5½ hours, with the reaction temperature being 150–158° C. The polyol product has an acid number of less than 0.5 and an equivalent weight of 173, and is dark golden brown, with a viscosity somewhat higher, than that of Example 20. If the above experiment is repeated with finely powdered sucrose, and the temperature maintained below 145° C., the resulting polyol is appreciably lighter in color.

The above polyol, 85 grams, is mixed with 1.0 gram of stannous octoate, 0.5 gram of tetramethyl-1,3-butanediamine, 4.5 grams of a block copolymer of ethylene oxide and dimethyl siloxane, 26 grams of Freon 11B, and 66 grams of polyfunctional polyphenylene polyisocyanate, the resulting foaming and foamed product are similar in characteristics to those of Example 18.

EXAMPLE 22

Example 21 is repeated using 141 grams of lactose hydrate and 15 grams of water in place of the sucrose and water used in the previous example. The polyol and resulting foam resemble closely those of Example 21.

EXAMPLE 23

The polyol is prepared in a fashion similar to that used in Example 21, with the materials used being 135 grams of maltose hydrate, 15.2 grams of demineralized water, 288 grams of phthalic anhydride, and 521 grams of propylene oxide. The reaction temperature is 145–154° C., and the reaction time 5½ hours. The product is golden brown, has an acid number of 0.8, an equivalent weight of 170, and a viscosity of about 10,000 centipoises at room temperature.

The polyol, 85 grams, is mixed with 0.5 gram of stannous octoate, 5 grams of a block copolymer of ethylene oxide and dimethyl siloxane, 22.5 grams of Freon 11B, and 66 grams of polyphenylene polyisocyanate. The resulting foam is similar to that prepared in Example 18, except that this foam is somewhat more brittle, and has slightly more shrinkage on cooling.

EXAMPLE 24

In a one-gallon nominal volume 316 stainless-steel, agitated pressure vessel is placed 1740 grams of propylene oxide, 1215 grams of phthalic anhydride, and 473 grams of glycerol. The vessel is closed and then heated with stirring to 130° C., at which temperature the heating is stopped. An exothermic reaction takes place, during which a tempertaure of 163° C. and a pressure of 145 p.s.i. are attained. The temperature is then maintained at 160° C. for the remainder of a 260-minute reaction time. The product has an acid number of 1.0, a hydroxyl number of 282 and a viscosity of 90 centipoises at 100° C., and a viscosity of about 100,000 centipoises at 25° C. The equivalent weight in 198.

The polyol, 300 grams, is mixed with 82 grams of Freon 11B, 3.0 grams of tetramethyl-1,3-butanediamine, 10.0 grams of a block copolymer of ethylene oxide and dimethylsiloxane, and 208 grams of polyphenylene polyisocyanate (PAPI) are mixed together. The mixing time is 16 seconds, the cream time 19 seconds, and the rise time 87 seconds, with a tack-free time of 10 seconds.

The finished foam has a density of 2.2 pounds per cubic foot, and a compressive strength of 33.6 p.s.i. at a 3.3% yield. The volume increase was 27.5% after 24 hours, 37.1% after 168 hours, and 38.8% after 336 hours aging at 70° C. and 100% relative humidity.

EXAMPLE 25

The polyol is prepared in a manner similar to that of Example 24. The materials used are 1190 grams of propylene oxide, 1667 grams of tetrachlorophthalic anhydride, and 451 grams of glycerol. The reaction time is 220 minutes, the maximum temperature is 175° C. and the maximum pressure 135 p.s.i. The product has an acid number of 0.4 and a hydroxyl number of 245, and has a viscosity of about 150 centipoises at 100° C. The equivalent weight is 228.

This polyol, 300 grams, is mixed with 77 grams of Freon 11B, 3.0 grams of tetramethyl-1,3-butanediamine, 5.0 grams of a block copolymer of ethylene oxide and dimethylsiloxane, and 180 grams of polyphenylene polyisocyanate (PAPI), and there results a mixing time of 15 seconds, and a 170 second rise time.

The resulting foam has a density of 1.6 pounds per cubic foot, and has a compressive strength of 23.7 p.s.i. at a 5.1% yield point. The foam has a 3.9% volume change after 24 hours, 1.2% volume change after 96 hours, and 6.2% volume change after 600 hours exposure to 70° C. and 100% relative humidity.

EXAMPLE 26

The polyol is prepared in a manner similar to that of Example 24. The materials used are the same, except that 1700 grams of tetrachlorophthalic anhydride is used. The reaction time is 120 minutes, and the maximum temperature reached is 190° C. and the maximum pressure is 150 p.s.i. The product has an acid number of 0.5, a hydroxyl number of 271, and a viscosity of 160 centipoises at 100° C. The equivalent weight is 207.

This polyol, 300 grams, is mixed with 80 grams of Freon 11B, 3.0 grams of tetramethyl-1,3-butanediamine, 5.0 grams of a block copolymer of ethylene oxide and dimethylsiloxane, and 200 grams of polyphenylene polyisocyanate (PAPI). The mixing time is 15 seconds, the cream time 18 seconds, and the rise time 180 seconds.

The resulting foam has a density of 1.8 pounds per cubic foot, and has a compressive strength of 25.6 p.s.i. at a 6.4% yield. The foam has a 2.4% volume increase in 24 hours, 4.8% volume increase in 96 hours and 9.9% volume increase in 600 hours exposure to 70° C. and 100% relative humidity.

EXAMPLE 27

The polyol is prepared in a manner similar to that of Example 24. The materials used are 1748 grams of propylene oxide, 1000 grams of phthalic anhydride, 353 grams of glycerol, and 349 grams of anhydrous sorbitol. The reaction time is 4 hours, and the maximum temperature attained is 170° C. and the maximum pressure 155 p.s.i. The product has an acid number of 0.6, a hydroxyl number of 408 and a viscosity of 162,000 centipoises at 25° C. The equivalent weight is 137.

This polyol, 300 grams, is mixed with 96 grams of Freon 11B, 3.0 grams of tetramethyl-1,3-butanediamine, 10.0 grams of a block copolymer of ethylene oxide and dimethylsiloxane, and 300 grams of polyphenylene polyisocyanate (PAPI). There is a mixing time of 15 seconds, a cream time of 18 seconds, and a rise time of 135 seconds.

The finished foam has a density of 2.03 pounds per cubic foot, a compressive strength of 44.7 p.s.i. at 6.5% yield and has a 3.6% volume increase after 18 hours, a 5.8% volume increase after 168 hours, and a 9.5% volume increase after 666 hours exposure to 70° C. and 100% relative humidity.

EXAMPLE 28

The polyol is prepared in a manner similar to that of Example 24. The materials used are 1442 grams of propylene oxide, 1220 grams of phthalic anhydride, and 787 grams of pentaerythritol. The reaction time is 4½ hours, and the maximum temperature reached is greater than 200° C., and the maximum pressure is 300 p.s.i. The product has an acid number of less than 0.1, and a hydroxyl number of 376, and has a viscosity of 810,000 centipoises at 25° C. The equivalent weight is 149.

This polyol, 300 grams, is mixed with 92 grams of Freon 11B, 3.0 grams of tetramethyl-1,3-butanediamine, 10.0 grams of a block copolymer of ethylene oxide and dimethylsiloxane, and 273 grams of polyphenylene polyisocyanate (PAPI). The mixing time is 21 seconds, at which point the mixture creams, and there is a 59 second rise time.

The resulting foam has a density of 1.8 pounds per cubic foot, and a compressive strength of 21.1 p.s.i. at a 7.0% yield.

EXAMPLE 29

The polyol is prepared in a manner similar to that of Example 24. The materials used are 1680 grams of propylene oxide, 1073 grams of phthalic anhydride, and 697 grams of anhydrous sorbitol. The reaction time is 4½ hours, the maximum temperature reached is in excess of 200° C., and the maximum pressure is 340 p.s.i. The product has an acid number of 0.6 and a hydroxyl number of 371, and has a viscosity of 440 centipoises at 100° C. The equivalent weight is 151.

This polyol, 300 grams, is mixed with 91 grams of Freon 11B, 3.0 grams of tetramethyl-1,3-butanediamine, 10.0 grams of a block copolymer of ethylene oxide and dimethylsiloxane, and 272 grams of polyphenylene polyisocyanate (PAPI). The mixing time is 12 seconds, the cream time is 30 seconds, and the rise time is 150 seconds.

The resulting foam has a density of 2.1 pounds per cubic foot, and has a compressive strength of 34.5 p.s.i. at a 5.9% yield. The foam has a 5.3% volume increase in 24 hours, 5.0% volume increase in 168 hours, and 6.9% volume increase on 672 hours exposure to 70° C. and 100% relative humidity.

The above experiment is repeated using 973 grams of dipentaerythritol in place of sorbitol as starter. The resulting polyol is similar in properties, but has an equivalent weight of 162 instead of 151. A foam is prepared from this latter polyol, using the same technique, except that 6% less polyisocyanate is used. The resulting foam is similar in properties to that of the above foam.

EXAMPLE 30

The polyol is prepared in a manner similar to that of Example 24. The materials used are 1601 grams of propylene oxide, 1060 grams of phthalic anhydride, 357 grams of glycerol, and 282 grams of sucrose. The reaction time is 4 hours, the maximum temperature attained is 160° C., and the maximum pressure 182 p.s.i. The product has an acid number of 0.5, a hydroxyl number of 323, and a viscosity of 245,000 centipoises at 25° C. The equivalent weight is 173.

This polyol, 300 grams, is mixed with 89 grams of Freon 11B, 3.0 grams of tetramethyl-1,3-butanediamine, 10.0 grams of a block copolymer of ethylene oxide and dimethylsiloxane, and 236 grams of Mondur MR polyisocyanate. The mixing time is 22 seconds and the rise time is 77 seconds.

The resulting foam has a density of 1.76 pounds per cubic foot, and a compressive strength of 30.5 p.s.i. at a 4.3% yield. The foam has a 3.5% volume increase in 24 hours, and a 2.5% volume increase in 696 hours exposure to 70° C. and 100% relative humidity. The foam has a 4.2% volume decrease in 24 hours and a 4.7% volume decrease in 696 hours exposure to minus 18° C. and 100% relative humidity.

EXAMPLE 31

In an agitated, heated, 1-liter 316 stainless steel pressure vessel was placed 183.8 grams of a mixture of aliphatic polyols of from 3 to 6 carbon atoms and having an average molecular weight of 160 and an equivalent weight of 31.9, 184.8 grams of phthalic anhydride, and 466 grams of propylene oxide. The vessel was sealed and heated at 300–320° F. for about 1 hour, at which point the pressure was 100 p.s.i. at 300° F. Then the vessel was cooled down and 1.7 grams of triethylamine was added. The reaction mixture was then reheated at 300–320° F. for 2 hours. The vessel was then vented and the product recovered. The product which weighed 737 grams was pale amber in color and had a viscosity of 147,400 centipoises at 12° C. The equivalent weight of this polyol was 130.

EXAMPLE 32

In a 1-liter, stirred, heated, 316 stainless steel pressure vessel was placed 82.4 grams of an oven dried canary corn dextrin (having a solubility of 95% in water), 108.7 grams of an aliphatic polyol mixture of from 3 to 6 carbon atoms having an average molecular weight of 160 and an equivalent weight of 31.9, 331.4 grams of phthalic anhydride and 437 grams of propylene oxide. The vessel was sealed and heated at 300–320° F. for 4½ hours. The vessel was then vented and the product collected. The product weighed 872 grams, and was straw-olive in color, and was somewhat cloudy in appearance. The viscosity was about 600,000 centipoises at 25° C.

We claim:

1. A polyurethane composition comprising the reaction product of (A) an organic polyisocyanate having at least two isocyanato groups with (B) a polyester-ether polyol, said polyol being formed by chemically combining in intimate admixture in the absence of a strongly basic catalyst at a temperature of from about 70° C. to about 200° C. under superatmospheric pressure for a length of time sufficient for the reactants to copolymerize (1) a polymerization starter having an average active-hydrogen functionality of at least 2.5 and being selected from the group consisting of water, hydrogen sulfide, and organic compounds having at least 2 radicals selected from the group consisting of hydroxyl, carboxyl, and sulfhydryl radicals, (2) from 1/10 to 1 mol per equivalent of said starter of a cyclic anhydride of the formula

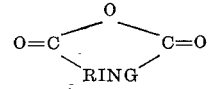

wherein RING is a cyclic hydrocarbon radical having from 6 to 12 carbon atoms and from zero to 6 halogen substituents selected from the group consisting of bromo and chloro radicals and (3) from 2 to 6 mols per mol of said cyclic anhydride of an epoxide of the formula

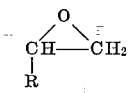

where R is selected from the group consisting of hydrogen, chloromethyl, and lower alkyl radicals.

2. The composition of claim 1 in which the said starter has an average active-hydrogen functionality of at least 3.

3. The composition of claim 1 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-2,3-heptenylene-5, and 2,2′-biphenylene.

4. The composition of claim 1 in which said polymerization starter consists of mixtures of not more than 30 percent by weight of water together with alcoholic-hydroxyl-group-containing compounds selected from the group consisting of saturated aliphatic polyols having from three to eight carbon atoms and from three to eight hydroxyl groups, water-soluble mono-saccharides and water-soluble polysaccharides.

5. The composition of claim 4 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7-hexachlorobicyclo-(2,2,1)-2,3-heptenylene-5, and 2,2′-biphenylene.

6. The composition of claim 1 in which the said starter is selected from the group consisting of carboxylic acids and hydroxycarboxylic acids having from two to eighteen carbon atoms and at least two radicals of the group consisting of —OH and —COOH radicals, with at least one of these radicals being a —COOH radical.

7. The composition of claim 6 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7 - hexachlorobicyclo-(2,2,1)-2,3-heptenylene-5, and 2,2′-biphenylene.

8. The composition of claim 1 in which the said starter is a polythiol.

9. The composition of claim 8 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7 - hexachlorobicyclo-(2,2,1)-2,3-heptenylene-5, and 2,2′-biphenylene.

10. The composition of claim 1 in which the said starter is a saturated aliphatic polyol having from three to fifteen carbon atoms and from three to eight hydroxyl groups.

11. The composition of claim 10 in which the said starter is a saturated aliphatic polyol having from three to six carbon atoms and from three to six hydroxyl groups.

12. The composition of claim 10 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7 - hexachlorobicyclo-(2,2,1)-2,3-heptenylene-5, and 2,2′-biphenylene.

13. The composition of claim 12 in which the said R is methyl, and said RING is 1,2-phenylene.

14. The composition of claim 11 in which the said R is methyl, and said RING is 3,4,5,6-tetrachloro-1,2-phenylene.

15. The composition of claim 11 in which the said R is methyl, and said RING is 3,4,5,6-tetrabromo-1,2-phenylene.

16. The composition of claim 11 in which the said R is methyl, and said RING is 1,4,5,6,7,7-hexachlorobicyclo-(2,2,1)-2,3-heptenylene-5.

17. The composition of claim 11 in which the said R consists of a mixture of —H and —CH₃, with the mol fraction of —H in the mixture being less than about 0.5, and the said RING is selected from the group consisting of 1,2-phenylene, 1,2,3,6-tetrahydro-1,2 - phenylene, 3,4,5,6-tetrachloro-1,2-phenylene, 3,4,5,6-tetrabromo-1,2 - phenylene, 1,4,5,6,7,7-hexachlorobicyclo-(2,2,1) - 2,3 - heptenylene-5, and 2,2′-biphenylene.

18. The composition of claim 11 in which the said R is —CH₂CH₃, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7-hexachlorobicyclo-(2,2,1) - 2,3-heptenylene-5, and 2,2′-biphenylene.

19. The composition of claim 11 in which the said R is —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo - 1,2-phenylene, 1,4,5,6,7,7-hexachlorobicyclo-(2,2,1)-2,3 - heptenylene-5, and 2,2′-biphenylene.

20. The composition of claim 1 in which said polymerization starter is selected from the group consisting of mono- and polysaccharides having from 5 to 18 carbon atoms and from four to 11 hydroxyl groups.

21. The composition of claim 20 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7 - hexachlorobicyclo-(2,2,1)-2,3-heptenylene-5, and 2,2′-biphenylene.

22. The composition of claim 21 in which the said saccharide is selected from the group consisting of dextrose, sucrose, lactose, maltose, xylose, and methyl glucoside.

23. The composition of claim 22 in which the said saccharide is dextrose.

24. The composition of claim 23 in which the said R is methyl and the said RING is 1,2-phenylene.

25. The composition of claim 21 in which the said saccharide is sucrose, and the said R is methyl and the said RING is 1,2-phenylene.

26. The composition of claim 1 in which the said polymerization starter is a mixture of not more than 90 percent by weight of a saturated aliphatic polyol having from three to six carbon atoms and from three to six hydroxyl groups and saccharides having from 5 to 18 carbon atoms and from 4 to 11 hydroxyl groups.

27. The composition of claim 1 in which the said polymerization starter is a mixture of from 5 percent to 90 percent by weight of a saturated aliphatic polyol having from three to six carbon atoms and from three to six hydroxyl groups and a polysaccharide having at least three monosaccharide units per molecule.

28. The composition of claim 26 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7 - hexachlorobicyclo-(2,2,1)-2,3-heptenylene-5, and 2,2′-biphenylene.

29. The composition of claim 27 in which the said polysaccharide is selected from the group consisting of dextrins and plant gums having a solubility in water of at least 75 percent by weight.

30. The composition of claim 29 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6-tetrachloro-1,2-phenylene, 3,4,5,6-tetrabromo-1,2-phenylene, 1,4,5,6,7,7-hexachlorobicyclo - (2,2,1) - 2,3 - heptenylene - 5, and 2,2′-biphenylene.

31. The composition of claim 27 in which said polysaccharide is a canary corn dextrin, said R is methyl, and said RING is 1,2-phenylene.

32. The composition of claim 27 in which said polysaccharide is a British gum, said R is methyl, and said RING is 1,2-phenylene.

33. The composition of claim 30 in which said polysaacharide is a cyclodextrin selected from the group consisting of alpha-cyclodextrin, beta-cyclodextrin, and gamma-cyclodextrin.

34. The composition of claim 1 in which the said polymerization starter is a hydrate of a saccharide having from 5 to 18 carbon atoms and from four to 11 hydroxyl groups.

35. The composition of claim 34 in which the said polymerization starter is selected from the group consisting of dextrose hydrate, raffinose hydrate, lactose hydrate, and maltose hydrate.

36. The composition of claim 35 in which the said R is selected from the group consisting of —H, —CH₃, —CH₂CH₃, and —CH₂Cl, and said RING is selected from the group consisting of 1,2-phenylene, 1,2,3,6-tetrahydro-1,2-phenylene, 3,4,5,6 - tetrachloro-1,2 - phenylene, 3,4,5,6 - tetrabromo - 1,2 - phenylene, 1,4,5,6,7,7 - hexachlorobicyclo - (2,2,1) - 2,3 - heptenylene-5, and 2,2′-biphenylene.

37. The composition of claim 1 in which the ratio of weight-average molecular weight to number-average molecular weight of said polyol is less than 1.5.

38. A rigid cellular polyurethane foam which comprises the reaction product of claim 1, said reaction product being prepared in the presence of a catalyst, a blowing agent, and a surfactant.

39. A polyurethane composition comprising the reaction product of (A) an organic polyisocyanate having at least two isocyanato groups with (B) a polyester-ether polyol, said polyol being prepared by reacting in intimate admixture in the absence of a strongly basic catalyst at a temperature of from about 70° C. to about 200° C. under superatmospheric pressure (1) a polymerization starter having an average active-hydrogen functionality of at least 2.5 and being selected from the group consisting of water, hydrogen sulfide, and organic compounds having at least 2 radicals selected from the group consisting of hydroxyl, carboxyl, and sulfhydryl radicals, (2) from 1/10 to 1 mol per equivalent of said starter of a cyclic anhydride of the formula

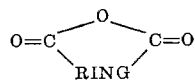

wherein RING is a cyclic hydrocarbon radical having from 6 to 12 carbon atoms and from zero to 6 halogen substituents selected from the group consisting of bromo and chloro radicals and (3) at least about 1.5 mols per mol of said cyclic anhydride of an epoxide of the formula

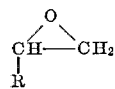

where R is selected from the group consisting of hydrogen, chloromethyl, and lower alkyl radicals, said (1), (2), and (3) being allowed to react for a length of time sufficient for said anhydride to become essentially completely combined and then adding (4) from about 0.05 to 5 percent by weight, based on the weight of the reaction mixture, of a tertiary amine catalyst having up to 21 carbon atoms and conducting further reaction at a temperature of from about 70° C. to about 200° C. under superatmospheric pressure for a length of time to cause the combination of from 2.05 to 10 mols of said epoxide per mol of said cyclic anhydride.

References Cited
UNITED STATES PATENTS 2,779,783  1/1957  Hayes _____ 260—485

DONALD E. CZAJA, Primary Examiner

H. S. COCKERAM, Assistant Examiner

U.S. Cl. X.R.

260—9, 18, 75, 30.4, 31.2, 32.8, 33.2

UNITED STATES PATENT OFFICE
CERTIFICATE OF CORRECTION

Patent No. 3,502,601                              March 24, 1970

Leslie C. Case et al.

It is certified that error appears in the above identified patent and that said Letters Patent are hereby corrected as shown below:

Column 7, line 12, "sassharides" should read -- saccharides --. Column 12, line 31, at the of the formula insert a subscript -- f --. Column 14, line 1, "equivalent weights of more than 150 can be used to pre-" should read -- equivalent weight range. It is a particularly novel and de- --.

Signed and sealed this 23rd day of February 1971.

(SEAL)
Attest:

Edward M. Fletcher, Jr.                        WILLIAM E. SCHUYLER, JR.
Attesting Officer                                  Commissioner of Patents